US007066384B2

(12) United States Patent
Yokoi et al.

(10) Patent No.: US 7,066,384 B2
(45) Date of Patent: Jun. 27, 2006

(54) BILL HANDLING MACHINE AND CONTROLLING METHOD FOR A BILL HANDLING MACHINE

(75) Inventors: Toshinori Yokoi, Nagakute (JP); Riichi Kato, Nagoya (JP); Minoru Kadowaki, Toyota (JP); Atsuko Uozumi, Owariasahi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/940,200

(22) Filed: Sep. 13, 2004

(65) Prior Publication Data

US 2005/0056693 A1 Mar. 17, 2005

(30) Foreign Application Priority Data

Sep. 16, 2003 (JP) ............................ 2003-323046

(51) Int. Cl.
*G06Q 40/00* (2006.01)

(52) U.S. Cl. ...................................................... 235/379

(58) Field of Classification Search ..................... None
See application file for complete search history.

(56) References Cited

U.S. PATENT DOCUMENTS 6,422,458 B1 7/2002 Katou et al.
6,889,898 B1 * 5/2005 Katou et al. ................ 235/379
2002/0088850 A1 * 7/2002 Katou et al. ................ 235/379
2002/0092905 A1 * 7/2002 Katou et al. ................ 235/379
2003/0120597 A1 * 6/2003 Drummond et al. .......... 705/43
2004/0011622 A1 * 1/2004 Omori et al. ............... 194/230
2004/0026499 A1 * 2/2004 Fujioka ...................... 235/379
2005/0108165 A1 * 5/2005 Jones et al. .................... 705/43

FOREIGN PATENT DOCUMENTS

EP 1008965 A1 8/2000
EP 1324285 A2 7/2003
JP 2003-0515050 2/2003
WO WO02/27670 A1 4/2002

* cited by examiner

*Primary Examiner*—Michael G. Lee
*Assistant Examiner*—Tae W. Kim
(74) *Attorney, Agent, or Firm*—Townsend and Townsend and Crew LLP

(57) ABSTRACT

A bill handling machine includes a bill discriminator which discriminates between genuine and counterfeit bills; a cash box including first and second bill storing boxes which store bills to be recycled, the first bill storing box for storing bills of first type, the second bill storing box for storing bills of second type; a non-genuine bill storing box which is provided outside the cash box and stores a bill that is suspected or determined to be non-genuine by the bill discriminator; a temporary stocker which temporarily stores bills prior to storing the bills in the first and second bill storing boxes or the non-genuine bill storing box; and a transport component configured to transport the bills to the temporary stocker, first and second bill storing boxes, and non-genuine bill storing box, wherein an entry to the non-genuine bill storing box is provided at a section of the transport path that is between the bill discriminator and temporary stocker.

19 Claims, 8 Drawing Sheets

FIG.4

Address information management data

| | Temporary stocker | 10000-yen stocker | 5000-yen stocker | 1000-yen stocker | Reject box | Non-genuine bill stocker | Reclaimed address |
|---|---|---|---|---|---|---|---|
| Nth bill | | | | | | | |
| : | | | | | | | |
| Second bill | 0002 | | | | | | |
| First bill | 0001 | | 0003 | | | | |

Discrimination result management data

| Address | Denomination | Genuine or false | Normal or worn | Front or back side | Source/Account information |
|---|---|---|---|---|---|
| 0001 | 10000-yen | Genuine | Normal | Front | 0000001 |
| 0002 | 1000-yen | False | Normal | ? | 0000001 |
| 0003 | 5000-yen | Genuine | ? | ? | 0000004 |
| | | | | | |

BILL HANDLING MACHINE AND CONTROLLING METHOD FOR A BILL HANDLING MACHINE

CROSS-REFERENCES TO RELATED APPLICATIONS

The present application claims priority from Japanese application JP2003-323046 filed on Sep. 16, 2003, the content of which is hereby incorporated by reference into this application.

BACKGROUND OF THE INVENTION

The present invention relates to a bill handling machine for receiving, storing, and dispensing bills.

Automated teller machines (hereafter referred to as ATMs) are used for deposits and withdrawals from and to customers in financial institutions and the like. The ATM has a built-in bill handling machine for receiving, storing, and dispensing bills. One typical example of the bill handing machine is a cash recycling type that allows received bills to be recycled for subsequent dispensing during another transaction. The cash recycling-type bill handling machine receives and dispenses bills as follows.

During a deposit, the bill handling machine discriminates denominations and genuineness of bills received from a bill in-out slot. A bill assumed to be genuine is stored in a temporary stocker. The other bills are returned to the bill in-out slot. This operation is referred to as "received bill count". After a user confirms the amount of deposit, the bill handling machine takes the bills stored in the temporary stocker and stores them in storing boxes for recycling (hereafter referred to as "recycle boxes") corresponding to denominations. Concurrently, the ATM notifies a host computer of the deposited amount, the account information, and the like. This operation is referred to as "received bill collection". During a withdrawal, the bill handling machine feeds bills equivalent to the specified amount to the bill in-out slot from the recycle boxes corresponding to the denominations.

Bills supplied to the bill handling machine may include those not suited for recycling. Such bills include, for example, badly damaged genuine bills, false bills, and questionable bills suspected to be false after the discrimination. When these bills are found during the received bill count, they are returned to the bill in-out slot. When these bills are found during the received bill collection, they are collected in a collection box called a reject box provided independently of the recycle box. Bills in the reject box are not used for the subsequent recycling. For example, JP-A No. 051050/2003 discloses the structure and operations of the above-mentioned cash recycling-type bill handling machine.

BRIEF SUMMARY OF THE INVENTION

In recent years, the quality of counterfeit bills has improved significantly. There is an increasing demand to prevent circulation of counterfeit bills. Considerable effort has been focused on discriminating counterfeit bills and questionable bills (hereafter both are referred to as "non-genuine bills") from genuine bills including damaged genuine bills and prevent those non-genuine bills from being circulated. If a non-genuine bill is detected by a bill handling machine, it should preferably be kept and returned to the user. Also the user's identify or related information should be stored for a possible follow-up investigation.

The conventional bill handling machine is not well suited for such purposes. The bill handling device of the present embodiments has been made in consideration of the foregoing. In one implementation, the bill handling machine is configured to collect and safely keep bills that have been determined to be non-genuine bills.

A bill handling machine according to the present embodiment comprises a bill discriminator to discriminate genuineness or falseness of bills, a storing box to store bills, and a transport path to convey bills in the bill handling machine. There are four types of storing boxes: a recycle box, a reject bill storing box, a non-genuine bill storing box, and a temporary stocker.

The recycle box is a storing container or box for storing recyclable bills and is included in a cash box. As used herein, the term "box" is used to refer to a container or holder that could have many different shapes according to desired applications. To provide easy recycling, it is desirable to provide a plurality of recycle boxes for different denominations. In one implementation, a single recycle box may store bills of different denominations if a smaller sized, bill handling machine is desired. The reject bill storing box stores genuine bills that are not suited for recycling, e.g., bills that are damaged or worn substantially. The reject bill storing box can be provided inside or outside the cash box. However, it is desirable to provide the reject bill storing box inside the cash box for better security. The temporary stocker temporarily stores bills prior to storing them in the recycle box, the reject bill storing box, and the non-genuine bill storing box.

The non-genuine bill storing box is provided outside the cash box. The non-genuine bill storing box stores counterfeit bills and questionable bills that are suspected as being counterfeits. The non-genuine bill storing box is provided independently of the reject bill storing box. The present embodiment comprises two types of storing boxes to store bills not suited for recycling, i.e., the non-genuine bill storing box and the reject bill storing box. An entry to the non-genuine bill storing box is connected to a section of the transport path between the bill discriminator and the temporary stocker. The entry may be directly connected to the transport path. Alternatively, the entry may be indirectly connected to a transport path branching from the transport path connecting between the bill discriminator and the temporary stocker.

The above configuration of the bill handling machine—provides the following advantages. Since the non-genuine bill storing box is provided independently of the reject bill storing box, only non-genuine bills can be collected separately. The non-genuine bill storing box is provided outside the cash box and makes collection of these bills relatively easy since the cash box does not need to be opened. The non-genuine bill storing box is connected to the transport path at the section between the bill discriminator and the temporary stocker. Accordingly, bills can be separately collected in the non-genuine bill storing box during a transport process between both. It has been found that the bill collection at such position provides great practical usefulness at least for the bill handling machine using the temporary stocker from the viewpoint of miniaturization of the apparatus, simplification of the transport control during the separated collection, and the like.

According to the present invention, the transport path just needs to be controlled by the following method corresponding to the timing of finding a non-genuine bill so as to store non-genuine bills in the non-genuine bill storing box. Consider a situation where a non-genuine bill is found as bills pass through the bill discriminator toward the temporary stocker. There is the timing when a bill passes through the bill discriminator toward the temporary stocker. For example, this timing is included in the received bill count process that conveys bills from the bill-in slot to the temporary stocker via the bill discriminator. There may be a case where the bill-out slot is provided along a branch from the transport path from the bill discriminator to the temporary stocker. In this case, the timing is included in the bill dispensing process that conveys bills from the recycle box to the bill-out slot via the bill discriminator.

When a non-genuine bill is found at such timing, it can be conveyed directly from the bill discriminator to the non-genuine bill storing box. If such control is provided, the following should be taken into consideration. Certain time is needed for conveying a bill up to the branch to the non-genuine bill storing box after passing through the bill discriminator. More time is needed for discriminating the bills. The former time should be longer than the latter. A possible method for realizing this relationship is, for example, to sufficiently decelerate the transport speed or to provide a sufficiently long transport path between the branch and the bill discriminator.

Another control method may be used to temporarily store a non-genuine bill in the temporary stocker, and then convey the non-genuine bill from the temporary stocker to the non-genuine bill storing box. This control method eliminates the above-mentioned restriction on the time. Accordingly, it is possible to avoid a problem of unnecessarily elongating the transport path or decelerating the transport speed.

Next, let us consider a situation where a non-genuine bill is found while bills pass through the bill discriminator from the temporary stocker. For example, such timing of finding a non-genuine bill is included in the received bill collection that collects bills stored in the temporary stocker to the recycle box.

To ensure this timing, control can be provided to temporarily store the non-genuine bill in the recycle box or the reject bill storing box, and then convey the non-genuine bill to the non-genuine bill storing box. It is preferable to use the recycle box in terms of being able to accurately take out bills during transport to the non-genuine bill storing box. The bill handling machine may be provided with a plurality of recycle boxes. In this case, it is possible to select a recycle box to be used for temporarily storing non-genuine bills independently of denominations. Furthermore, during transport from the recycle box to the non-genuine bill storing box, any of the following methods can be used. One method is to temporarily store bills in the temporary stocker and then convey them to the non-genuine bill storing box. Another method is to convey bills to the non-genuine bill storing box without using the temporary stocker. According to the former method, bills are collected in the non-genuine bill storing box only in the process of transporting bills from the temporary stocker to the bill discriminator. It is possible to simplify the structure of the branch to the non-genuine bill storing box. The latter method can shorten the time for transporting bills.

The bill handling machine according to the present embodiment gives permission to obtain and manage the source information on each non-genuine bill stored in the non-genuine bill storing box. The source information provides information on the person or thing that provided the non-genuine bill to the bill handling machine. The source information may be an account number or other information c. e.g., account number of the person who provided the non-genuine bill. When a non-genuine bill is found from bills supplied from the bill in-out slot, the source information can be easily obtained since the user information is needed to deposit the bills into the bill handling machine. The source information may include information a recycle box from which a non-genuine bill has been taken out. When a non-genuine bill is found during cash dispensation, it is difficult to directly identify the person who had supplied the non-genuine bill. The recycle box can be used as the source information to estimate the source of the non-genuine bill. Moreover, it may be preferable to manage information capable of identifying users of bills stored in the recycle boxes. This information can be used to identify a user or supplier of the non-genuine bill that was found during the cash dispensation from the recycle boxes.

The bill handling machine or an automatic transaction apparatus using the same generally notifies a user of completion of a transaction. The notification may be provided by some indications and sounds, or by return of a card, a bankbook, or any other media used for transactions. The present bill handling machine can also implement the notification at various times. When a transaction accompanied by cash reception requires the discrimination during the received bill collection, the notification may be postponed until completion of the received bill collection. This can detain a user near the apparatus in the event of finding a non-genuine bill during the received bill collection. Such construction is applicable irrespectively of the cash recycling-type. It may be possible to omit the discrimination during the received bill count. When the discrimination is performed during the received bill count, a discrimination result can be used. Only when a non-genuine bill is found, it may be preferable to perform the above-mentioned control, i.e., postponing the notification until completion of the received bill collection. If no non-genuine bill is found during the received bill count, the transaction can be completed without awaiting completion of the received bill collection. This can shorten the transaction time. It is possible to use the control of postponing the notification of transaction completion until completion of the received bill collection together with the above-mentioned various processes.

The present bill handling machine may be constructed to provide controls to do the following. When counting bills inserted into the bill-in slot, the bill discriminator is used to discriminate genuine bills, reject or damaged bills unsuitable for recycling, and non-genuine bills. All of these bills are temporarily stored in a temporary stocker. The non-genuine bills are subsequently stored in a non-genuine bill collection box. In this case, the non-genuine bill storing box may be provided at various positions including inside or outside the cash box.

In the configuration above, it may be preferable to store bills in the temporary stocker and then send non-genuine bills, if any exists, to the non-genuine bill collection box. Moreover, the bills determined to be non-genuine may be discriminated again as they are sent from the temporary stocker to the non-genuine bill collection box.

The present embodiment can be implemented in various different ways. In addition to those described above, the concepts of the present embodiment may be realized as a computer program and a storage media storing the same. The storage media can include various computer-readable media such as flexible disks, CD-ROM, DVD, magnetic optical disks, IC cards, ROM cartridges, punch cards, printouts where bar codes or other codes are printed, and computer's internal storages (memories such as RAM and ROM) and external storages.

Since the present invention provides the non-genuine bill storing box independently of the reject bill storing box, the non-genuine bills can be collected separately. The non-genuine bill storing box is provided outside the cash box and makes collection of bills relatively easy. The non-genuine bill storing box is connected to the transport path at the section between the bill discriminator and the temporary stocker. Accordingly, bills can be separately collected in the non-genuine bill storing box during a transport process between both.

In one embodiment, a bill handling machine includes a bill discriminator which discriminates between genuine and counterfeit bills; a cash box including first and second bill storing boxes which store bills to be recycled, the first bill storing box for storing bills of first type, the second bill storing box for storing bills of second type; a non-genuine bill storing box which is provided outside the cash box and stores a bill that is suspected or determined to be non-genuine by the bill discriminator; a temporary stocker which temporarily stores bills prior to storing the bills in the first and second bill storing boxes or the non-genuine bill storing box; and a transport component configured to transport the bills to the temporary stocker, first and second bill storing boxes, and non-genuine bill storing box, wherein an entry to the non-genuine bill storing box is provided at a section of the transport path that is between the bill discriminator and temporary stocker.

In another embodiment, a bill handling machine includes a bill input slot to receive bills; a bill discriminator to discriminate whether or not a bill received via the bill input slot is genuine; a temporary stocker to temporarily store the bills received via the bill input slot; a non-genuine bill storing box to store a bill that is determined not to be genuine by the bill discriminator; a genuine bill storing box to store a bill that is determined to be genuine by the bill discriminator; and a transport component to transport bills received via the bill input slot to the temporary stocker, non-genuine bill storing box, and genuine bill storing box. The temporary stocker, bill input slot, and non-genuine bill storing box are provided in an upper housing of the bill handling machine. The genuine bill storing box is provided in a lower housing of the bill handling machine, the upper and lower housings being independent and separate housings to enable non-genuine bills stored in the non-genuine bill storing box to be collected without opening the lower housing wherein the genuine bill storing box is enclosed. The bill handling machine provides control to count the bills received via the bill input slot by using the bill discriminator, the bill discriminator discriminating whether each of the bills received is genuine, reject bill not suitable for circulation, or a non-genuine bill. The bill handling machine stores temporarily the bills received via the bill input slot in a temporary stocker after discriminating it using the bill discriminator, a bill that has been determined to be non-genuine bill being transported to the non-genuine bill storing box via the transport component.

In yet anther embodiment, a method for controlling operations of a bill handling machine is disclosed. The bill handling machine comprises a bill input slot to receive bills; a bill discriminator to discriminate whether or not a bill is genuine; a cash box containing a recycle box which stores bills to be recycled; a reject bill storing box which stores genuine bills unsuitable for recycling; a non-genuine bill storing box to store a bill that has been determined to be non-genuine by the bill discriminator, the non-genuine bill storing box being provided outside the cash box and independently of the reject bill storing box; a temporary stocker to temporarily store bills during a process of storing bills in the recycle box, the reject bill storing box, and the non-genuine bill storing box; and a transport component to transport the bills from one location to another in the bill handling machine, wherein an input slot of the non-genuine bill storing box is connected to a section of the transport component provided between the bill discriminator and the temporary stocker. The control method comprises discriminating whether or not each of the bills received via the bill input slot is genuine using the bill discriminator; transporting the each bill to the temporary stocker after discriminating the each bill using the bill discriminator; and sending a bill that has been determined to be non-genuine from the temporary stocker to the non-genuine bill storing box.

BRIEF DESCRIPTION OF THE DRAWINGS

FIG. 4 diagrams a data structure of a storing box DB;

DETAILED DESCRIPTION OF THE INVENTION

An embodiment of the present invention will be described as follows.

A. General construction
B. Bill handling machine
C. Functional blocks
D. Operation modes
E1. Bill reception control process
E2. Modification of the bill reception control process
F. Bill dispensing control process
G. Modified examples

A. General construction

Figure 1:
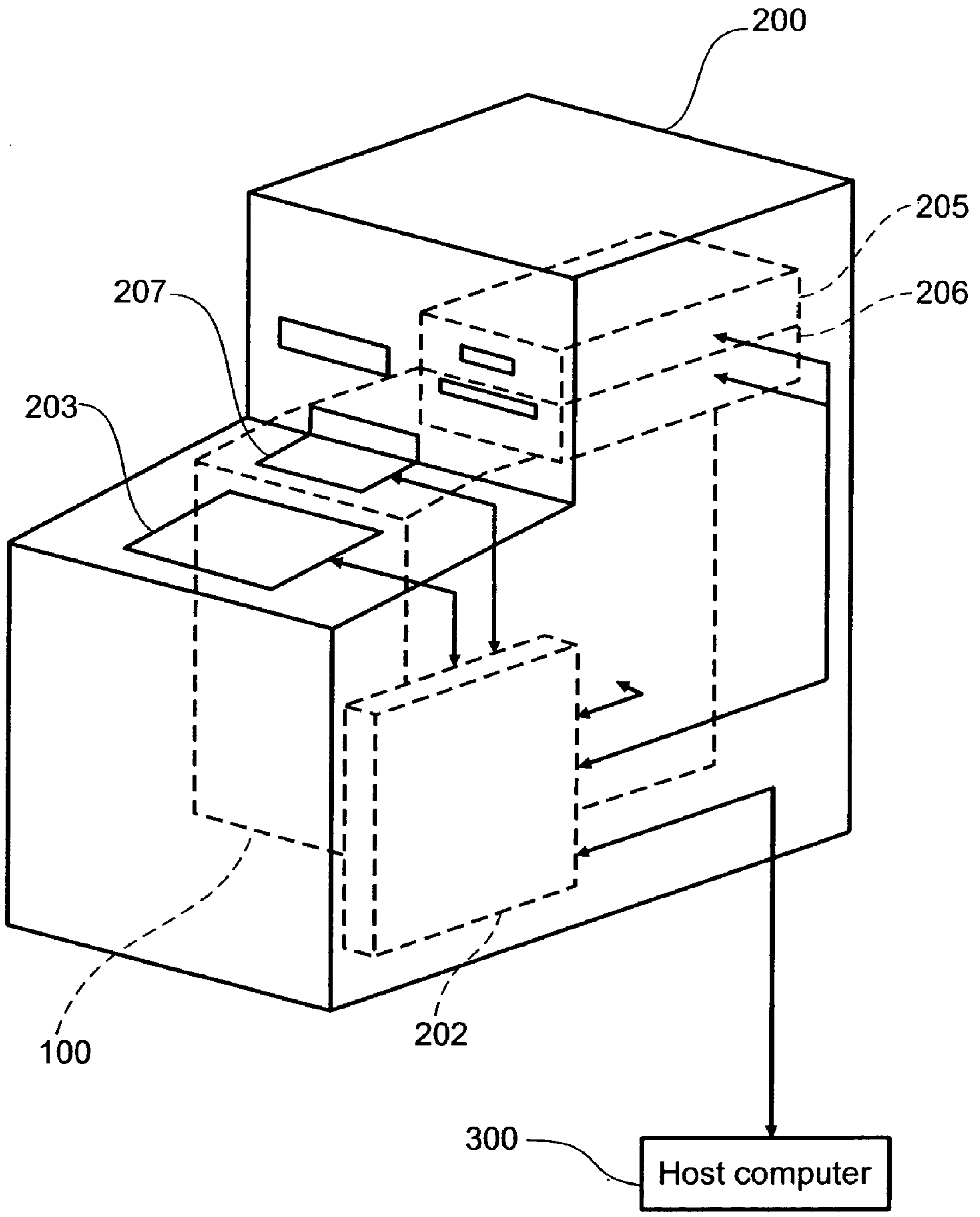
FIG. 1 schematically illustrates the construction of an automated teller machine 200 as an embodiment.

FIG. 1 schematically illustrates the construction of an automated teller machine 200 as an embodiment. The automated teller machine 200 is installed in a bank, for example, and is used to receive and dispense bills in accordance with user operations.

The automated teller machine (hereafter referred to as ATM) 200 according to the embodiment comprises the following units, as shown in FIG. 1. A card handling mechanism 205 reads information recorded on a magnetic stripe card such as a cash card. The information recorded on the card includes a financial institution number, account titles, and a user's account number, for example.

An operation unit 203 functions as an interface with users for displaying information about deposit and/or withdrawal transactions and allowing input operations for receiving and dispensing bills. The operation unit 203 uses a touch panel according to the embodiment but may be configured to be a combination of a display and push button switches.

A bill in-out slot 207 is used to receive and dispense bills from and to users. To receive cash, a user places bills in the bill in-out slot 207. A built-in bill handling machine 100 discriminates the supplied bills and classifies them according to denominations for storage. To dispense cash, the bill handling machine 100 provides bills corresponding to the user's desired amount of money and transfers the bills to the user via the bill in-out slot 207. A transaction record issuing mechanism 206 issues a transaction record of the deposit or withdrawal.

A control unit 202 controls operations of each unit in the ATM 200. The control unit 202 is configured as a micro computer comprising a CPU and memory. As indicated with arrows in FIG. 1, the control unit 202 exchanges information with the respective units to control operations of the entire ATM 200. The control unit 202 is connected to a host computer 300 via a communication link. The control unit 200 transmits information about transactions to the host computer 300. The host computer 300 then performs processes such as deposit to or withdrawal from the user account.

B. Bill Handling Machine

Figure 2:
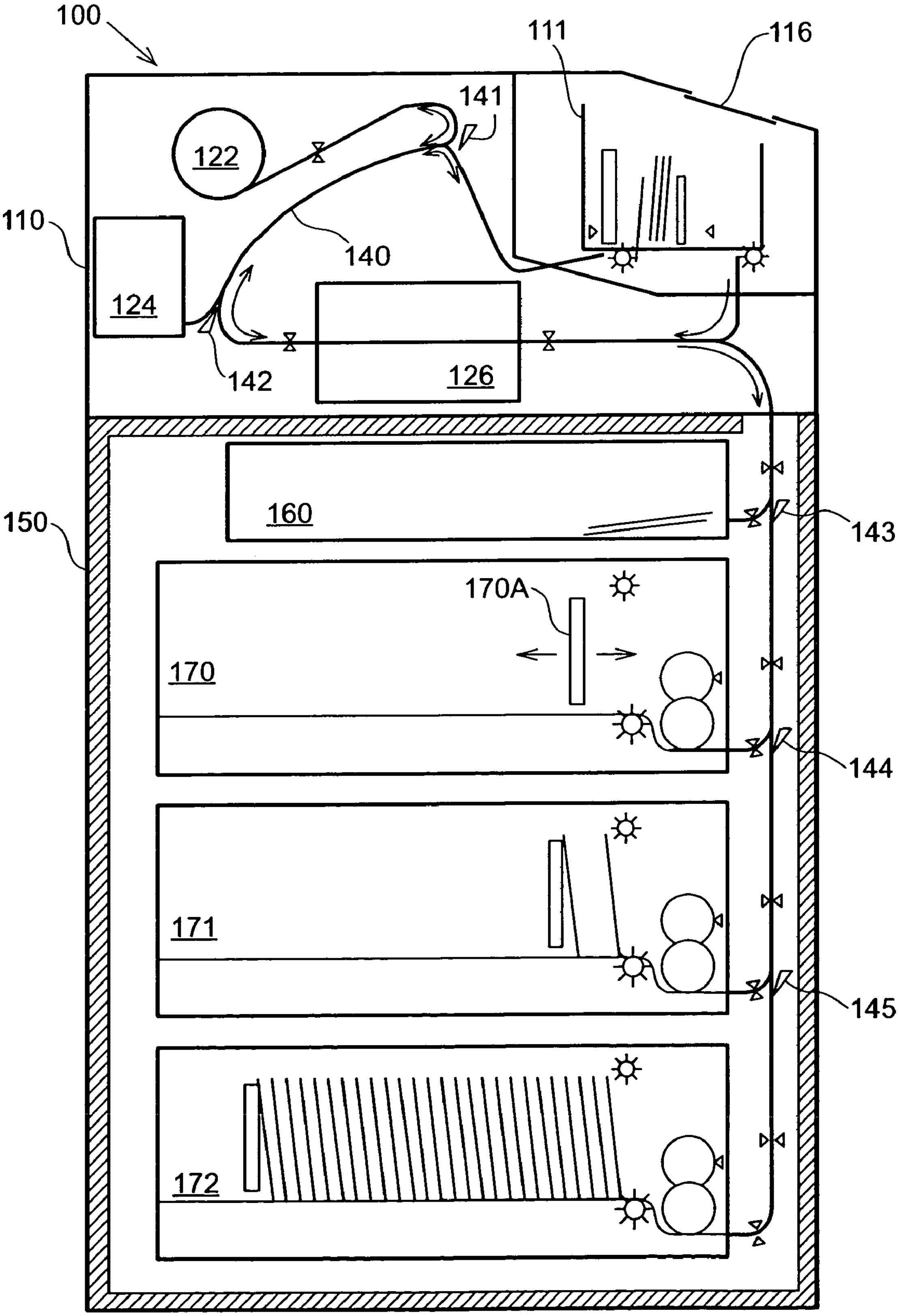
FIG. 2 is a side sectional view schematically illustrating the structure of a bill handling machine 100.

FIG. 2 is a side sectional view schematically illustrating the structure of the bill handling machine 100. The bill handling machine 100 is known as the cash recycling-type and reuses the received bills for the subsequent cash dispensation. The bill handling machine 100 comprises a cash box 150 and an upper unit 110.

The cash box 150 is covered with a thick metal plate and is strongly built. The cash box 150 comprises recycle boxes 170 through 172 and a reject box 160. The recycle boxes 170 through 172 store normal bills (hereafter referred to as "genuine bills") usable for cash dispensation. The reject box stores genuine bills inappropriate for reuse (hereafter referred to as "reject bills") due to excessive damage or the like.

A specific denomination is predetermined for each of the recycle boxes 170 through 172. The recycle box 170 is provided with a movable pressure plate 170A to keep bills arranged in order in the box. The similar pressure plate is provided for the other recycle boxes 171 and 172.

The upper unit 110 is structured as follows. A bill in-out unit 111 is a space for dispensing or receiving bills from users. A shutter 116 is provided at an entry to the bill in-out unit 111. The shutter automatically opens and closes in interlock with the above-mentioned bill in-out slot 207 of the ATM 200.

A bill discriminator 126 discriminates the denominations of bills and the genuineness of bills, and outputs the result. To perform the discrimination, the bill discriminator 126 scans a bill to obtain various information such as image data, magnetic characteristics, and optical characteristics against the ultraviolet light.

The upper unit 110 contains a temporary stocker 122 that temporarily stores bills during a process of receiving and dispensing bills. The temporary stocker 122 stores bills in the order they are conveyed, and feeds bills in the reverse order. According to the embodiment, bills are carried on a belt wound around a rotary drum.

The upper unit 110 further comprises a non-genuine bill storing box 124 to store counterfeit bills detected by the bill discriminator 126 and questionable bills whose genuineness cannot be confirmed. Both types of these bills are referred to as "non-genuine bills". According to the embodiment, the non-genuine bill storing box 124 also has a pressure plate to keep bills arranged in order. Alternatively, the non-genuine bill storing box 124 may be a simple box that stores bills in a disorderly fashion.

A conveyor 140 transports bills in the bill handling machine 100. The conveyor 140 is a mechanism to transport bills using transport mechanisms such as rollers and belts. Along paths of the conveyor 140, there are provided gates to change transport destinations of bills. A gate 141 switches between the temporary stocker 122 and the bill in-out unit 111. A gate 142 selects the non-genuine bill storing box 124 as a transport destination. A gate 143 selects the reject box 160 as a transport destination. Gates 144 and 145 select recycle boxes 170 through 172 as transport destinations.

The bill handling machine 100 contains a control unit (not shown). The control unit is configured to be a microcomputer comprising a CPU and memory and controls operations of the bill handling machine 100 according to a program installed therein.

C. Functional Block

Figure 3:
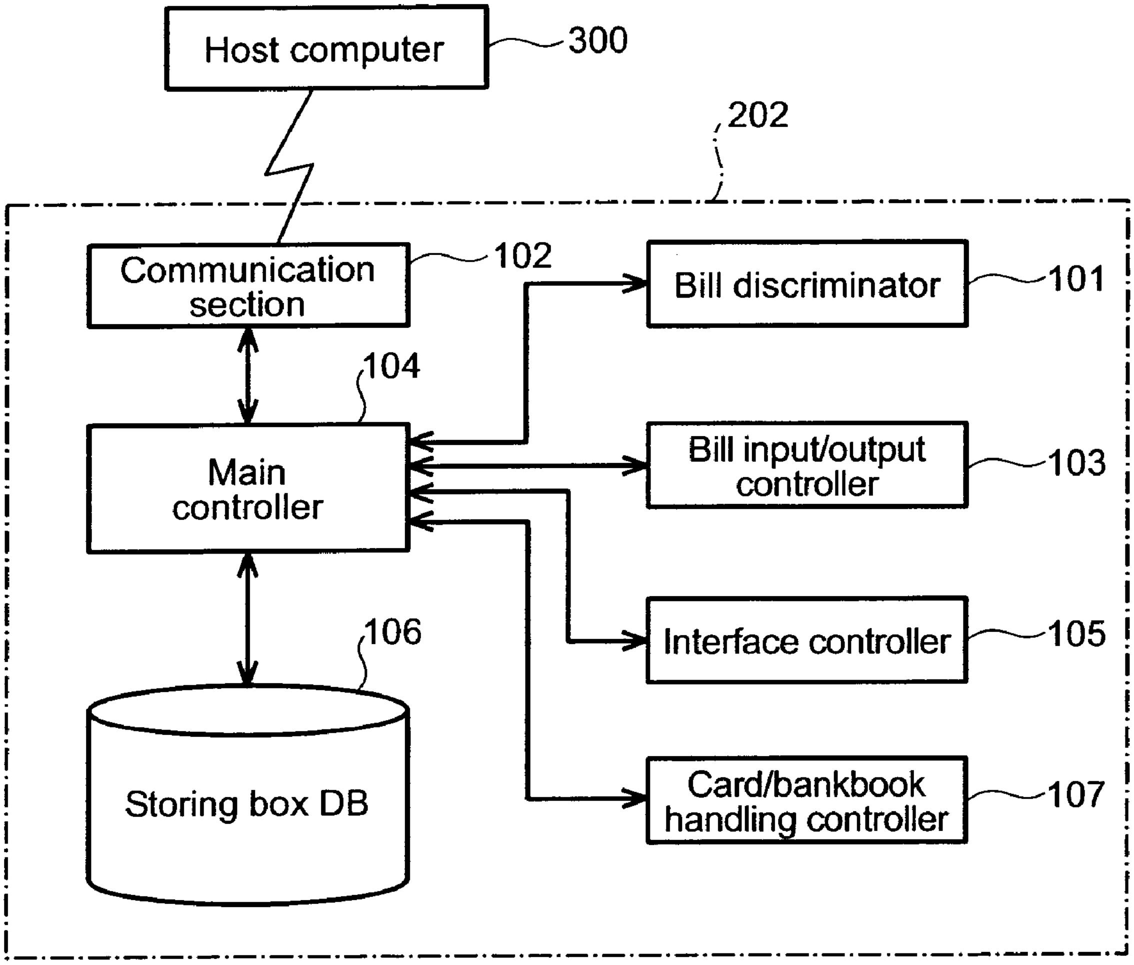
FIG. 3 illustrates functional blocks of the ATM 200.

FIG. 3 illustrates functional blocks of the ATM 200. The functional blocks in FIG. 3 are constructed as software in the control unit 202 according to one embodiment. The functional blocks can be also constructed as hardware.

The functional blocks for the ATM 200 implements the following functions under control of the main controller 104. A communication unit 102 controls communication with the host computer 300. A discrimination execution unit 101 uses the bill discriminator 126 to discriminate bills. A bill in-out controller 103 controls transport of bills to be received or dispensed. An interface controller 105 supplies screen information to the operation unit 203 and accepts user input operations. A card/bankbook handling controller 107 obtains a financial institution number, account titles, and a user's account number for transaction from a cash card or a bankbook and makes an entry on the bankbook.

Using a storing box database (DB) 106, the ATM 200 records source information and the like about bills stored in each storing box for each bill. The storing box DB 106 records source information about bills also in the non-genuine bill storing box 124 for each bill. Accordingly, reference to the storing box DB 106 can relatively easily specify a source of non-genuine bills.

FIG. 4 diagrams a data structure of the storing box DB. For convenience of description, FIG. 4 exemplifies a case where the recycle boxes 170 through 172 are provided with a 10000-yen stocker, a 5000-yen stocker, and a 1000-yen stocker to store ten-thousand-yen bills, five-thousand-yen bills, and five-thousand-yen bills, respectively. The storing box DB comprises two types of data: address information management data and discrimination result management data. The address information management data manages address information of the memory that stores discrimination results corresponding to bills stored in the temporary stocker, the 10000-yen stocker, the 5000-yen stocker, the 1000-yen stocker, the reject box, and the non-genuine bill storing box. The example in FIG. 4 shows that data for the first bill in the temporary stocker is stored at address 0001. The first bill signifies that the bill is conveyed into each storing box for the first time.

Each storing box is configured so that the last received bill is dispensed first. Accordingly, the address information management data is managed in a stack fashion. That is to say, the address storage areas increase in the order of the first bill, the second bill, and so on to nth bill, for each time a bill is received by the storing box. Each time a bill is output from the storage box the address storage areas decrease from the nth bill, n−1th bill, and so on to the first bill. The address areas in each storing box are managed by a stack pointer, i.e., data indicating how many bills are stored in each storing box.

The address information management data also manages address information about unused areas in the discrimination result management data. The unused address area does not comply with the concept of "first bill, second bill, . . . , and nth bill". For the simplification of the database structure, however, the embodiment manages the unused address area in a stack fashion like the storing boxes.

The discrimination result management data stores results of discriminating the bills. According to the embodiment, a discrimination result stores the denomination, the genuine or false bill, the normal or worn bill, and the front or back side of the bill. The discrimination result management data stores source information as well as discrimination results. The source information identifies a customer who supplied the bill. According to the embodiment, the source information corresponds to an account number acquired from a cash card and the like during the process of receiving bills. Account numbers and the like cannot be identified for bills that are placed in the bill handling machine 100 by an administrator. Such bill may be identified to have no source information or to have "unknown" source information. Alternatively, the source information may be recorded so as to specify a recycle box where the bill was stored.

The discrimination result management data manages these pieces of information for each bill. The example in FIG. 4 shows that the memory area represented by address 0001 stores the discrimination result of: denomination=10000-yen; genuine or false=genuine; normal or worn=normal; front or back side=front side; and source information=0000001. While the discrimination results to be stored are represented by alphanumeric characters for convenience of description, data for each entry can be encoded for storage.

The embodiment permits outputs of "unknown" or "uncertain" as discrimination results. For example, a bill may not be clearly determined to be genuine or counterfeit depending on discriminations. With respect to such bill, the discrimination outputs a result of "questionable bill" and registers it to the discrimination result management data. As mentioned above, the embodiment equally treats "counterfeit bills" and "questionable bills" as non-genuine bills. Both types of bills may be treated differently.

The following describes data management when bills are conveyed. As shown in FIG. 4, let us consider a case of storing bills in the temporary stocker as the first and second bills and in the 5000-yen stocker as the first bill. As mentioned above, the discrimination result for each bill is stored in a memory area corresponding to the address indicated by the address information management data.

In this state, it is assumed that the second bill in the temporary stocker is exported to the non-genuine bill storing box and that the first bill therein is exported to the 10000-yen stocker. Correspondingly to the export, the address information management data is managed as follows. Address information 0002 was stored at the area for the second bill in the temporary stocker, and then is moved to the area for the first bill in the non-genuine bill storing box. Address information 0001 was stored at the area for the first bill in the temporary stocker, and then is moved to the area for the first bill in the 10000-yen stocker.

Let us consider a case of dispensing bills from the 5000-yen stocker. Unlike the transport between storing boxes, dispensing bills eliminates the need for management of discrimination results. The discrimination result management data stores data at address 0003 corresponding to the dispensed bill. Dispensing the bill removes this data. In addition, the unused address information 0003 is moved to an area for managing the unused address in the address information management data.

In this manner, the storing box DB according to the embodiment moves the address information to eliminate the need for moving the entire data for discrimination results. It is possible to relatively easily manage discrimination results in synchronization with movement of bills between the storing boxes. The storing box DB is not limited to the structure exemplified herein but can be applied to various structures capable of managing discrimination results in correspondence with bills in the storing boxes. It may be preferable to provide a fixed area corresponding to bills in each storing box and move data itself indicating the discrimination result. The embodiment has shown the example of managing discrimination results corresponding to the arrangement of bills in the storing boxes. If the correspondence between both is available, any method can be used to manage discrimination results.

D. Operation Modes

Figure 5:
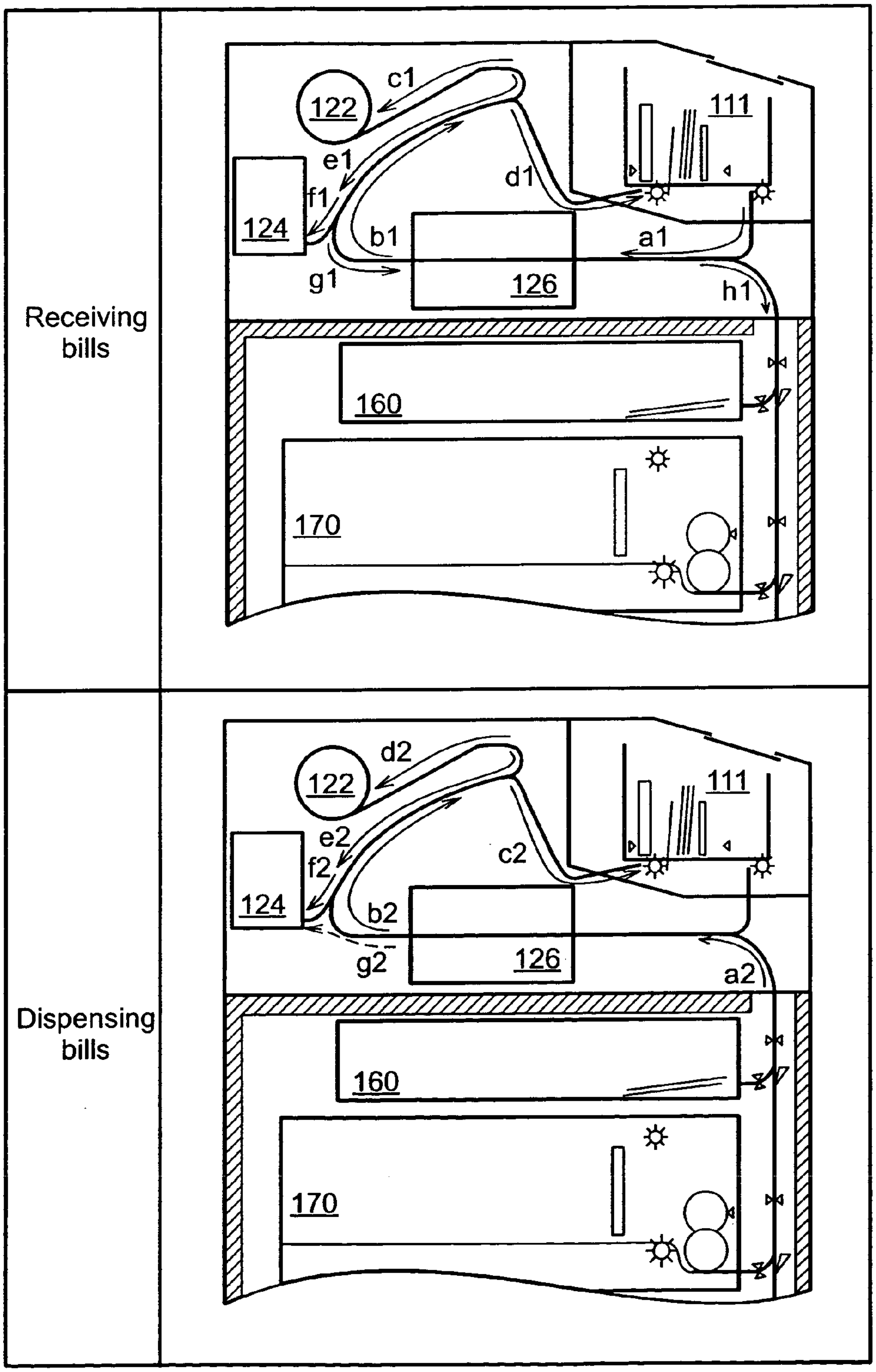
FIG. 5 illustrates operation modes of the bill handling machine 100.

FIG. 5 illustrates operation modes of the bill handling machine 100. In FIG. 5, the upper part schematically shows a state of conveying bills for reception. The lower part schematically shows a state of conveying bills for dispensation.

In a bill input process, a user inserts a bill into the bill in-out unit 111. The bill passes through the bill discriminator 126 as indicated by arrows a1 through c1. After the discrimination, the bill is stored in the temporary stocker 122. When the bill is determined to be a reject bill after the discrimination, the bill is returned to the bill in-out unit 111 as indicated by arrow d1. According to the embodiment, an unquestionable bill is stored in the temporary stocker 122. The ATM 200 determines denominations of the received bills and the number of bills according to the discrimination and calculates a sum of money. The operation so far is referred to as a received bill count.

The user confirms the sum of money displayed on the touch panel, and then specifies a deposit. The bill handling machine 100 takes bills from the temporary stocker 122 as indicated by arrows e1, g1, and h1. The bill handling machine 100 then stores bills in the respective recycle boxes via the bill discriminator 126. The operation so far is referred to as a received bill collection. During the received bill collection, a non-genuine bill stored in the temporary stocker 122 is stored in the non-genuine bill storing box 124 as indicated by arrow f1. The bill discriminator 126 discriminates bills also during the received bill collection. When a reject bill is found, the transport is controlled so that the bill is stored in the reject box 160. When a non-genuine bill is found during the received bill collection, the bill is stored in the recycle box and then is transported to the non-genuine bill storing box 124 during the cash dispensation to be described later.

During the cash dispensation, the ATM 200 determines denominations and the number of bills to be dispensed in accordance with the amount specified by the user, and then takes bills from the recycle boxes. As indicated by arrows a2 through c2 in FIG. 5, the bills are conveyed to the bill in-out unit 111 via the bill discriminator 126. This operation is referred to as a bill dispensing process. The bill discriminator 126 discriminates bills also during the bill dispensing process. When the discrimination detects a non-genuine bill, the bill is stored in the temporary stocker 122 as indicated by arrow d2. After completion of the bill dispensing process, the bill is transported to the non-genuine bill storing box 124 as indicated by arrows e2 and f2.

The bill handling machine 100 also performs the transport similar to the cash dispensation when a non-genuine bill is found during the received bill collection and is stored in the recycle box. When non-genuine bills are stored in the recycle boxes, the bill handling machine 100 sequentially takes the non-genuine bills from the corresponding recycle boxes and stores them in the temporary stocker 122. This operation continues until all the non-genuine bills are exhausted from the recycle boxes. At this time, the temporary stocker 122 contains genuine bills and non-genuine bills together. The bill discriminator 126 may or may not discriminate bills during transport from the recycle boxes to the temporary stocker 122.

Upon completion of the transport to the temporary stocker 122, the bill handling machine 100 takes bills from the temporary stocker 122 and stores non-genuine bills in the non-genuine bill storing box 124 as indicated by arrows e2 and f2. The bill handling machine 100 re-stores genuine bills in the respective recycle boxes in the same manner as the received bill collection.

As a modification, the bill handling machine 100 may be provided with an auxiliary transport path or gate structure along the transport path between the bill discriminator 126 and the temporary stocker 122. The purpose is to realize storage of bills from the bill discriminator 126 to the non-genuine bill storing box 124. In this manner, it is possible to directly convey non-genuine bills taken out of the recycle boxes to the non-genuine bill storing box 124 as indicated by arrow g2 without mediation of the temporary stocker 122.

The above-mentioned structure, if provided, allows non-genuine bills found during the received bill count to be directly stored in the non-genuine bill storing box 124 without being stored in the temporary stocker 122. In this case, however, a discrimination result is requested until a bill reaches the branch to the non-genuine bill storing box 124 after passing through the bill discriminator 126. To satisfy this request, special considerations need to be taken to decrease the bill transport speed in accordance with the process time for the bill discriminator 126 or to elongate a transport path from the bill discriminator 126 to the branch. The transport control according to the embodiment temporarily stores non-genuine bills in the temporary stocker 122 and then conveys them to the non-genuine bill storing box 124. Consequently, it is possible to eliminate such time restrictions and avoid problems of decreasing the transport speed and increasing the apparatus size.

E1. Bill Reception Control Process

Figure 6:
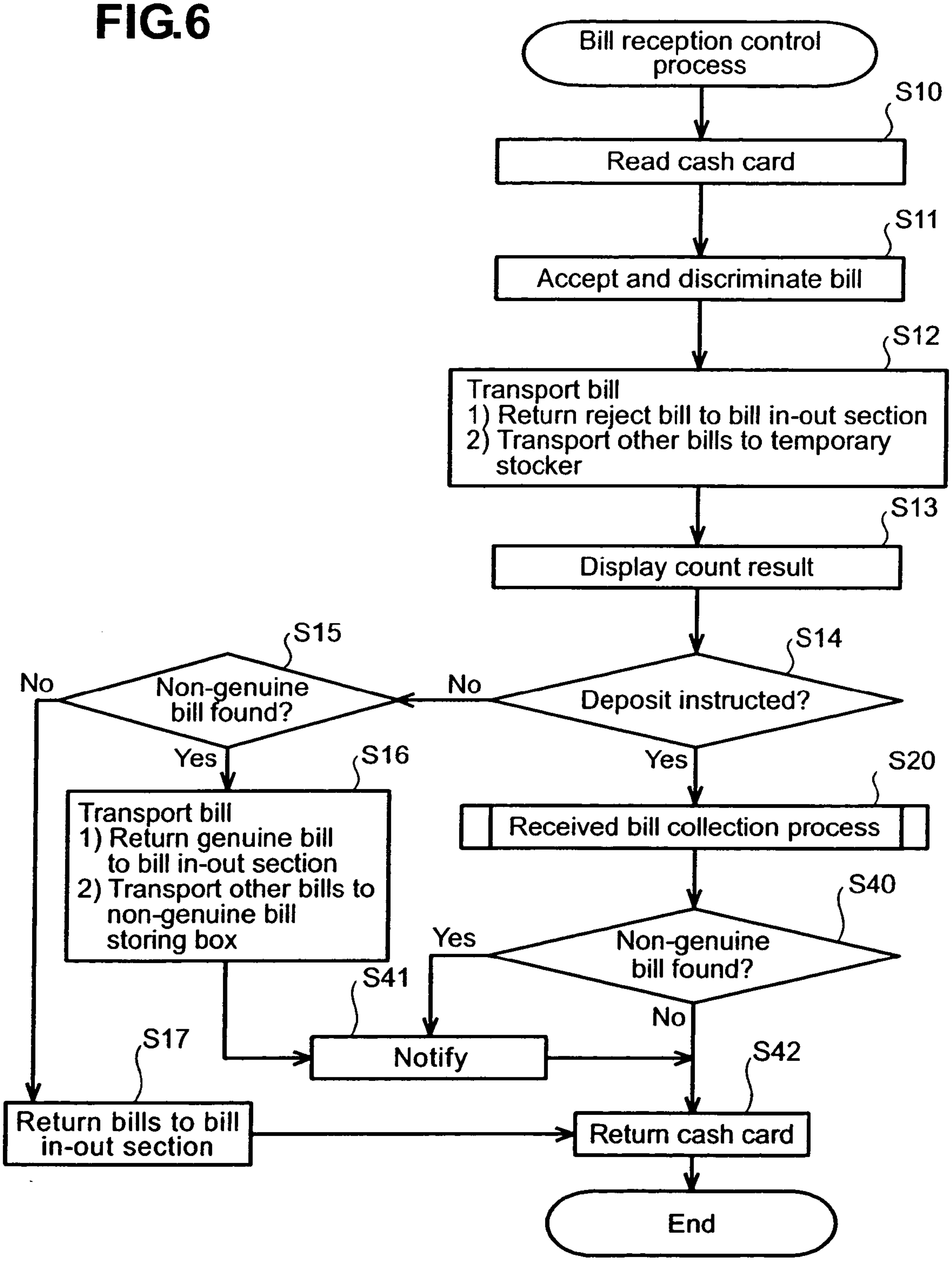
FIG. 6 is a flowchart showing a bill reception control process.

FIG. 6 is a flowchart showing a bill reception control process according to one embodiment of the present invention. The control unit 202 performs this process when a user selects a transaction requiring the cash reception such as deposits and money transfers. The control unit of the bill handling machine 100 may implement at least part of the process.

When this process starts, the control unit 202 reads information needed for the transaction such as a customer's account number from a cash card (step S10). The control unit 202 receives bills from the bill in-out unit 111 and discriminates them (step S11). Based on a discrimination result, the control unit 202 transport the bills (step S12). As mentioned above, reject bills are returned to the bill in-out unit 111. The other bills are stored in the temporary stocker 122. In addition to these operations, the control unit 202 displays a count result (step S13).

At step S14, the count result is displayed to the user and requests confirmation from the user. If the user disagrees and does not confirm the count result, it is determined whether or not a non-genuine bill is found (step S15). If a non-genuine bill has been found, the bill reception control process proceeds to step S16. At step S16, all genuine bills received from the user are transported back to the bill in-out section to be returned to the user. The non-genuine bill, however, is transported to the non-genuine bill storing box since counterfeit bills should be taken out of circulation. The control unit 202 then notifies a predefined destination, e.g., an administrator of a financial institution, police, or the like via a network, so that an appropriate action may be taken On the other hand at step S15, if no non-genuine bill has been found, all bills are returned to the bill in-out section (step S117).

Referring back to step S14, if the user confirms the displayed amount and specifies the deposit (step S14), the control unit 202 performs the received bill collection process (step S20). The contents of this process will be described later.

Thereafter, it is determined whether or not a non-genuine bill was detected at step 11 (step S40). If so, the control unit 202 notifies a predefined destination, so that an appropriate action may taken (step S41). This notification enables police or another authorized agency to promptly investigate this matter by contacting the user who supplied the non-genuine bill.

At step S40, if no non-genuine bill is found, the control unit 202 returns the cash card (step S42) to complete the transaction. In this manner, the return of the cash card is delayed until the received bill collection is complete, making it possible to detain the user at the ATM 200. This enables a prompt countermeasure to be taken when a non-genuine bill is found.

The timing to return the cash card is not limited to the embodiment above and different timings may be used according to implementation. For example, let us consider a case where no non-genuine bill is found during the received bill count (step S11). In such a case, the cash card may be returned at the time of specifying the deposit (step S14) concurrently with the received bill collection process (step S20). If a non-genuine bill is found during the received bill count (step S11), the cash card just needs to be returned at the timing as shown in FIG. 6. The use of this process can expedite the completion of the transaction if no non-genuine bill is found.

Figure 7:
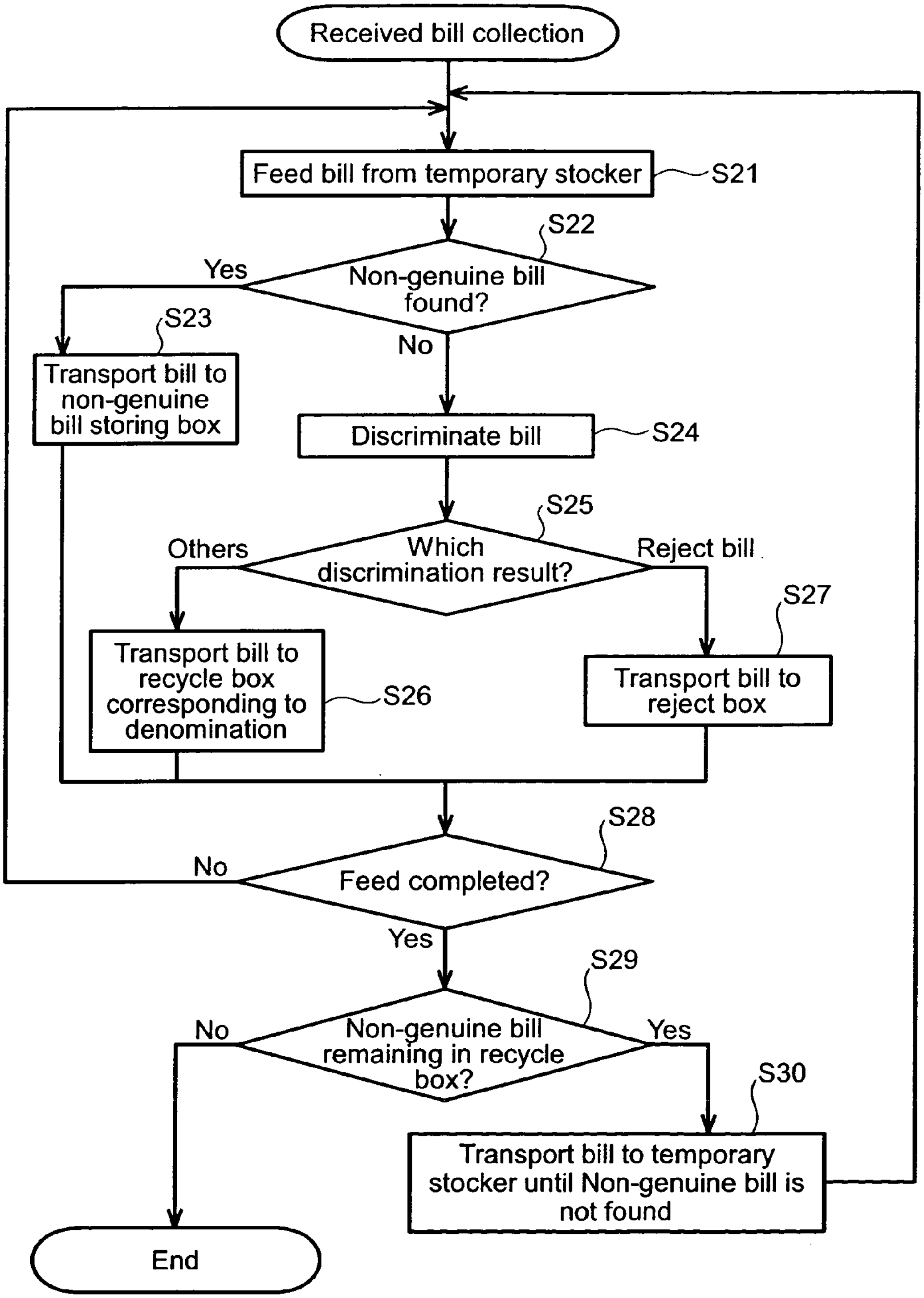
FIG. 7 is a flowchart showing a received bill collection process.

FIG. 7 is a flowchart showing a received bill collection process. This process corresponds to the process at step S20 in FIG. 6. The control unit 202 takes a bill out of the temporary stocker 122 (step S21). If a non-genuine bill is found (step S22), the control unit 202 controls the gate 142 and stores the non-genuine bill in the non-genuine bill storing box (step S23).

If the bill is not a non-genuine bill, the control unit 202 stores it in the recycle box. Since the bill passes through the bill discriminator 126 during this process, the control unit 202 discriminates the bill (step S24). This discrimination may be omitted.

If the discrimination finds a reject bill, the control unit 202 controls the gate 143 to store the bill in the reject box 160 (step S27). The control unit 202 stores the other bills including non-genuine bills in the corresponding recycle boxes 170 through 172 (step S26). The control unit 202 repeats the above-mentioned process until all bills are completely taken out of the temporary stocker 122 (step S28).

When the takeout operation is complete, the control unit 202 determines whether or not the recycle boxes contain a non-genuine bill (step S29). The determination can be performed by referencing the data in the storing box DB 106, for example.

If the recycle boxes contain no non-genuine bill, the control unit 202 completes the received bill collection process. If there are non-genuine bills, the control unit 202 conveys them to the temporary stocker until all the non-genuine bills are exhausted from the corresponding recycle box (step S30). Thereafter, the control unit 202 reexecutes the received bill collection process. The reference to the storing box DB 106 can also easily specify recycle boxes for transport to the temporary stocker and the number of bills to be conveyed. The non-genuine bills stored in the recycle box are conveyed to the non-genuine bill storing box 124 after the process at steps S22 and S23.

E2. Modification of the Bill Reception Control Process

The above-mentioned received bill collection is implementable without using the storing box DB 106. If the discrimination (step S24) during the received bill collection finds a non-genuine bill, for example, the control unit 202 may set a flag indicating the existence of non-genuine bill. By referencing this flag, the control unit 202 can determine whether or not the recycle boxes contain a non-genuine bill (step S29). Since the received bill count process confirms the number of received bills, all the received bills just need to be conveyed to the temporary stocker at step S30. During this transport, the discrimination can be performed to identify the non-genuine bill.

F. Bill Dispensing Control Process

Figure 8:
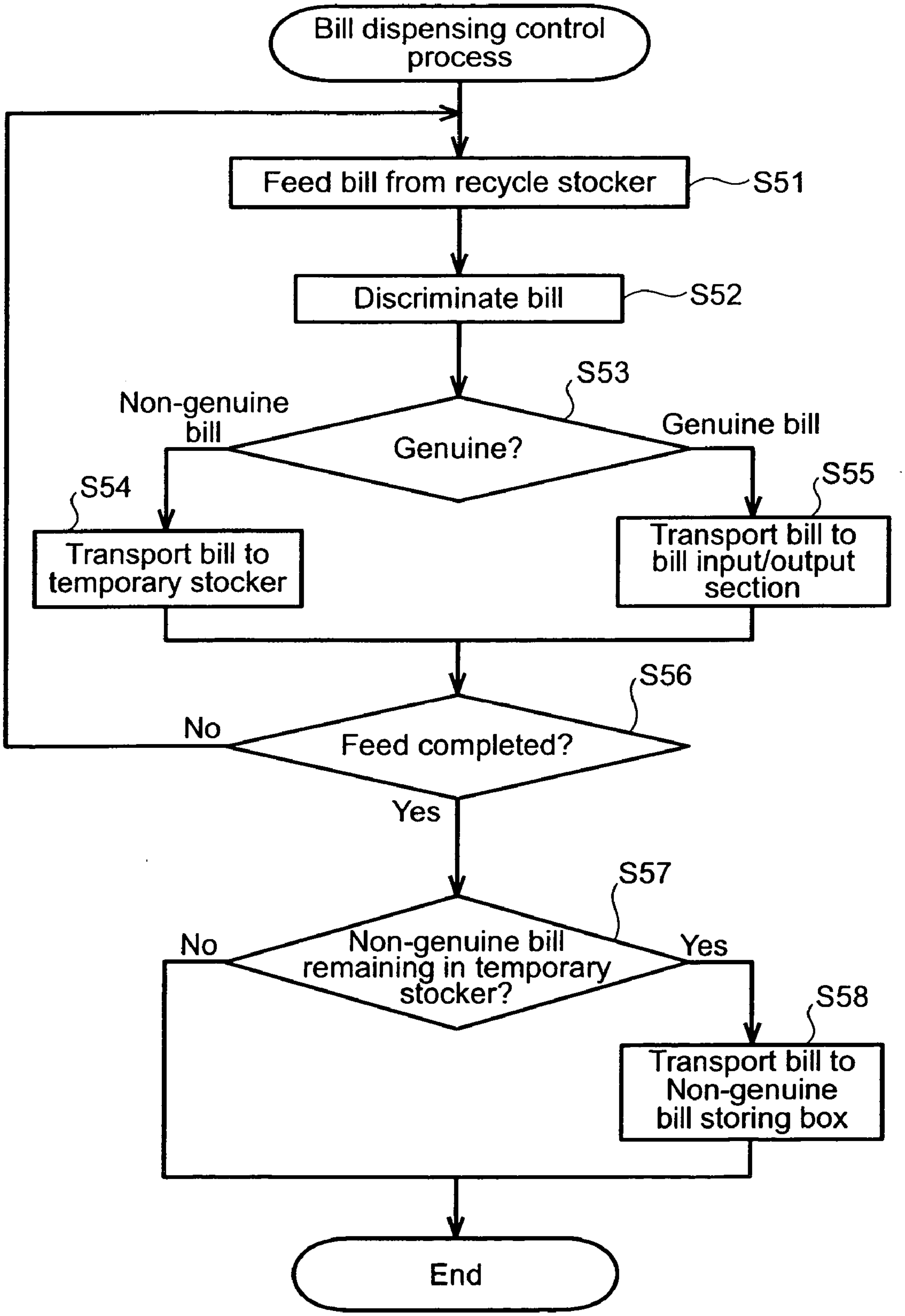
FIG. 8 is a flowchart showing a bill dispensing control process.

FIG. 8 is a flowchart showing a bill dispensing control process. The control unit 202 performs this process when a user selects transactions requiring the cash dispensation such as withdrawals. The control unit of the bill handling machine 100 may implement at least part of the process.

In this process, the control unit 202 takes bills out of the recycle boxes 170 through 172 corresponding to the amount and the number of bills specified (step S51). The control unit 202 uses the bill discriminator 126 to discriminate bills (step S52). The control unit 202 conveys non-genuine bills to the temporary stocker (step S54). The control unit 202 conveys genuine bills to the bill in-out unit 111 (step S55). The control unit 202 repeats the above-mentioned process until all the specified bills have been taken out.

When the takeout operation is complete, the control unit 202 determines whether or not the temporary stocker 122 contains a non-genuine bill (step S57). If a non-genuine bill is found, the control unit 202 conveys it to the non-genuine bill storing box (step S58). The determination at step S57 can be performed by referencing the data in the storing box DB 106. It may be preferable to use a flag indicating the presence or absence of non-genuine bills instead of the storing box DB 106.

G. Modified Examples

The embodiment has shown the structure that allows bills to pass through the bill discriminator 126 during the received bill collection. Further, the present invention is also applicable to a bill handling machine having a transport path constructed to store bills in the recycle box without allowing bills to pass through the bill discriminator 126 during the received bill collection. Moreover, the present invention is also applicable to the construction that provides the non-genuine bill storing box in the cash box.

The present invention has been illustrated using specific embodiments for the benefit of those skilled in the art. These embodiments may be modified or changed without departing from the scope of the present invention. The appended claims should be used to define the scope of the present invention.

What is claimed is:

1. A bill handling machine comprising:

a bill discriminator which discriminates between genuine and counterfeit bills;

a cash box including first and second bill storing boxes which store bills to be recycled, the first bill storing box for storing bills of first type, the second bill storing box for storing bills of second type;

a non-genuine bill storing box which is provided outside the cash box and stores a bill that is suspected or determined to be non-genuine by the bill discriminator;

a temporary stocker which temporarily stores bills prior to storing the bills in the first and second bill storing boxes or the non-genuine bill storing box; and a transport component configured to transport the bills to the temporary stocker, first and second bill storing boxes, and non-genuine bill storing box, wherein an entry to the non-genuine bill storing box is provided at a section of the transport path that is between the bill discriminator and temporary stocker.

2. The bill handling machine of claim 1, further comprising:

a reject bill storing box which stores genuine bills that are determined to be not suited for recycling, the reject bill storing box provided within the cash box, the reject bill storing box being a different box than the non-genuine bill storing box, wherein the first and second bill storing boxes are first and second recycle boxes.

3. The bill handling machine of claim 1, wherein the transport component defines a bill transport path that terminates at the second bill storing box.

4. The bill handling machine of claim 1, further comprising:

an upper housing provided above the cash box, the upper housing enclosing the bill discriminator, the non-genuine bill storing box, and the temporary stocker.

5. The bill handling machine according to claim 1, further comprising:

a transport controller which controls operations of the transport component, wherein, when the non-genuine bill is found while passing through the bill discriminator toward the temporary stocker, the transport controller causes the non-genuine bill to be stored in the temporary stocker and then transport the non-genuine bill to the non-genuine bill storing box.

6. The bill handling machine according to claim 5, further comprising:

an input slot to receive a plurality of bills, wherein the transport controller controls the transport component to transport the plurality of bills received at the input slot to the temporary stocker, each of the plurality of bills being examined by the bill discriminator as the bill is being transported to the temporary stocker, the plurality of bills being counted as the bills are being transported to the temporary stocker.

7. The bill handling machine according to claim 5, further comprising:

an output slot to dispense a bill, the output slot being connected to a section of the transport path provided between the bill discriminator and the temporary stocker, wherein the transport controller provides controls transport of the bill from the recycle box to the output slot.

8. The bill handling machine according to claim 1, further comprising:

a transport controller which controls operations of the transport path, wherein the transport controller provides control to temporarily store in a box a bill that is determined to be non-genuine as the bill passes through the bill discriminator from the temporary stocker.

9. The bill handling machine according to claim 8, wherein the box to which the bill that is determined to be non-genuine is temporarily stored is one of the recycle boxes or a reject bill storing box provided in the cash box, wherein the bill is thereafter transported to the non-genuine bill storing box.

10. The bill handling machine according to claim 8, wherein the transport component is configured in a conveyable manner from the recycle box to the non-genuine bill storing box without the use of the temporary stocker.

11. The bill handling machine according to claim 8, further comprising:

an input slot to receive the bill, wherein, after a bill inserted into the input slot is conveyed to the temporary stocker, the transport controller controls transporting of the bill from the temporary stocker into the recycle box.

12. The bill handling machine according to claim 1, further comprising:

a user information acquisition unit which acquires user information on a person who provided the non-genuine bill into the bill handling machine; and a information management unit which manages the user information corresponding to each non-genuine bill store in the non-genuine bill storing box.

13. The bill handling machine of claim 12, wherein the user information is account information.

14. The bill handling machine of claim 1, wherein the bill handling machine is an automatic teller machine.

15. A method for controlling operations of a bill handling machine wherein the bill handling machine comprises:

a bill input slot to receive bills;

a bill discriminator to discriminate whether or not a bill is genuine;

a cash box containing a recycle box which stores bills to be recycled;

a reject bill storing box which stores genuine bills unsuitable for recycling;

a non-genuine bill storing box to store a bill that has been determined to be non-genuine by the bill discriminator, the non-genuine bill storing box being provided outside the cash box and independently of the reject bill storing box;

a temporary stocker to temporarily store bills during a process of storing bills in the recycle box, the reject bill storing box, and the non-genuine bill storing box; and a transport component to transport the bills from one location to another in the bill handling machine, wherein an input slot of the non-genuine bill storing box is connected to a section of the transport component provided between the bill discriminator and the temporary stocker; and wherein the control method comprises:

discriminating whether or not each of the bills received via the bill input slot is genuine using the bill discriminator;

transporting the each bill to the temporary stocker after discriminating the each bill using the bill discriminator; and sending a bill that has been determined to be non-genuine from the temporary stocker to the non-genuine bill storing box.

16. The method of claim 15, further comprising:

notifying a predefined agent if one or more of the bills received via the bill input slot is determined to be a non-genuine bill, wherein the predefined agent is provided with information on a user who had provided the non-genuine bill via the bill input slot.

17. The method of claim 16, wherein the information provided is the user's account information.

18. The method of claim 16, further comprising:

retaining a card of the user who provided the non-genuine bill via the bill input slot until the notifying step has been completed.

19. The method of claim 15, further comprising:

returning those bills of the bills received via the bill input slot that have been determined to be genuine while keeping the non-genuine bill in the non-genuine bill storing box.

* * * * *